United States Patent [19]

Ansel

[11] Patent Number: 4,624,994
[45] Date of Patent: Nov. 25, 1986

[54] SOFT AND TOUGH RADIATION-CURABLE COATINGS FOR FIBER OPTIC APPLICATION

[75] Inventor: Robert E. Ansel, Hoffman Estates, Ill.

[73] Assignee: DeSoto, Inc., Des Plaines, Ill.

[21] Appl. No.: 170,148

[22] Filed: Jul. 18, 1980

[51] Int. Cl.$^4$ .............................................. C08F 20/18
[52] U.S. Cl. .................................... 525/440; 525/455; 525/920
[58] Field of Search ..................... 525/920, 455, 440

[56] References Cited

U.S. PATENT DOCUMENTS

| | | | |
|---|---|---|---|
| 3,297,745 | 1/1967 | Fekete et al. | 525/455 |
| 4,097,439 | 6/1978 | Darling | 525/455 |
| 4,108,840 | 8/1978 | Friedlander | 525/455 |
| 4,129,709 | 12/1978 | Lorenz et al. | 525/455 |
| 4,153,776 | 5/1979 | Friedlander et al. | 525/920 |
| 4,198,200 | 4/1980 | Fonda et al. | 525/455 |
| 4,232,133 | 11/1980 | Farrarini et al. | 525/455 |
| 4,246,379 | 1/1981 | Howard | 525/920 |
| 4,254,230 | 3/1981 | Howard | 525/920 |
| 4,260,703 | 4/1981 | Hodakowski et al. | 525/455 |
| 4,316,974 | 2/1982 | Ohmura et al. | 525/455 |
| 4,330,657 | 5/1982 | Disteldorf et al. | 525/455 |

*Primary Examiner*—Melvyn I. Marquis
*Assistant Examiner*—Robert E. L. Sellers
*Attorney, Agent, or Firm*—Dressler, Goldsmith, Shore, Sutker & Milnamow, Ltd.

[57] ABSTRACT

A radiation-curable liquid coating composition which cures on radiation exposure to form a soft and tough coating and which is adapted for coating optical fiber is disclosed. This composition comprises a polyurethane, polyamide or polyurea oligomer having (1) a molecular weight in the range of about 2000 to about 8000; (2) amide, urea or urethane groups in an amount of one such group for every 300 to 900 units of weight; and (3) polyalkylene polyether, polyalkylene polysulfide or polyalkylene polyester groups in which the alkylene moiety contains 2-6 carbon atoms. The polyether, polysulfide or polyester constitutes about 40% to about 90% by weight of the oligomer, and each end of the oligomer is terminated with a monoethylenically unsaturated addition polymerizable group. From 20% to 50% of the weight of the composition is a radiation-curable monoethylenically unsaturated monomer having a $T_g$ below about 10° C., and from 2% to 20% of the composition is a monoethylenically unsaturated monomer having a strong capacity for hydrogen bonding, such as vinyl pyrrolidone.

18 Claims, No Drawings

SOFT AND TOUGH RADIATION-CURABLE COATINGS FOR FIBER OPTIC APPLICATION

TECHNICAL FIELD

This invention relates to radiation-curable liquid coating compositions which cure to form coatings which are both soft and tough, and to glass fibers coated therewith.

BACKGROUND ART

Radiation-curable liquid coating compositions are well known, and many of these involve diacrylate-terminated polyurethane oligomers, However, these known compositions are relatively hard when cured. One can, of course, dilute the diacrylate-terminated polyurethane with a large proportion of radiation-curable monomer of low $T_g$ (glass transition temperature) so that radiation exposure will cure the coating and produce a soft layer instead of a hard one. However, these soft layers have little strength and, hence, little utility (other than as pressure-sensitive adhesives).

In recent years, glass fiber has become important for the transmission of beams of light used for communication. These must be coated to protect the fiber surface against abrasion, to preserve strength and to prevent microbending when mechanically manipulated, and to prevent microbending when the coated fiber is subjected to changes in temperature. These complex characteristics demand an unusual coating, namely, one which is both soft and tough. Moreover, this toughness must be achieved without introducing stiffness which would cause microbending when the coating contracts at low temperature.

DESCRIPTION OF THE INVENTION

In accordance with this invention, a radiation-curable liquid coating is provided which cures on radiation exposure to form a soft and tough coating This coating composition comprises a polyurethane, polyamide or polyurea oligomer having: (1) a molecular weight in the range of about 2000 to about 8000; (2) amide, urea or urethane groups in an amount of one such group for every 300 to 900 units of weight; and (3) polyalkylene polyether, polyalkylene polysulfide, or polyalkylene polyester groups in which the alkylene moiety contains from 2-6 carbon atoms, said polyether, polysulfide or polyester constituting from about 40% to about 90% by weight of the oligomer. Each end of the oligomer is terminated with a monoethylenically unsaturated addition polymerizable group which is preferably acrylic. From 20% to 50%, based on the total weight of the composition, is constituted by a radiation-curable monoethylenically unsaturated monomer having a $T_g$ below about 10° C. to provide desired softness. Lastly, from about 2% to about 20%, based on the total weight of the composition, is constituted by a monoethylenically usaturated monomer which has a strong capacity for hydrogen bonding to provide the desired toughness.

The polyurethane, polyamide or polyurea oligomer on which the compositions of this invention are based are subject to considerable variation so long as the following parameters are observed.

First, these oligomers must have an average molecular weight of from about 2000 to about 8000, preferably about 2500 to 6000 so as to properly space the ethylenically unsaturated terminal groups. If these groups, which cure by addition polymerization, are improperly spaced, the cured coatings will either be too soft and deformable, or too stiff and rigid.

Second, there must be an appropriate concentration of toughness-inducing groups. These are preferably urethane groups, but amide groups and urea groups are also useful. This is why polyurethanes, polyamides and polyureas are all useful, though polyurethanes are preferred. The number of such groups is just as important as their selection, and there should be an average of one such group for every 300 to 900 units of weight, preferably for every 400 to 600 units of weight.

Third, from about 40% to about 90% of the oligomer, preferably from 50% to 75%, should be selected from the group of polyalkylene polyether, polyalkylene polysulfide and polyalkylene polyester in which the alkylene moiety contains from 2-6 carbon atoms, preferably from 2-4 carbon atoms. The molecular weight of this component is subject to wide variation, from 300 to 2000 being typical, preferably from 600-1200. At the higher molecular weights within the range, not every oligomer molecule will contain the required number of components, so it is the average which is important. This component of the oligomer provides a capacity for elongation which helps to allow the coatings to absorb the stresses induced by thermal change and mechanical abuse.

The oligomer is a linear polymer which is terminated at each end with a monoethylenically unsaturated addition polymerizable group (which provides a total of two). These are cured by exposure to radiation which may be of diverse type, such as beta rays, electron beam and actinic radiation, especially ultraviolet light. When ultraviolet light is to be used, the initiators and/or photosensitizers normally used for this purpose will be employed herein. Since ultraviolet light is preferred, acrylic unsaturation is best, but since the radiation character can vary, so can the specific character of the unsaturation. Other useful unsaturations are illustrated by methacrylic, itaconic, crotonic, allylic, vinylic, etc.

To illustrate the foregoing, a polyurethane which is diisocyanate-terminated is reacted with an equivalent proportion of 2-hydroxyethyl acrylate. Alternatively, a half equivalent of hydroxyethyl acrylate is used, and the monoethylenic monoisocyanate so-provided is tied together using any convenient difunctional chain-extending agent, such as a diamine, a diol, an amino alcohol, a dithiol, a diacid, and an hydroxy acid. Diamines are illustrated by 1,6-hexane diamine, amino alcohols by monomethyl ethanol amine, dithiols by 1,6- hexane dithiol, diacids by succinic acid and adipic acid, and hydroxy acids by glycine and alanine.

It is also possible to react one mole of the agent providing terminal unsaturation with one mole of an organic diisocyanate, especially toluene diisocyanate. Thus, 2-hydroxyethyl acrylate reacted with a molar proportion of 2,4-toluene diisocyanate provides a monoethylenic monoisocyanate which can then be reacted with an amine-terminated polyamide or an hydroxy-functional polyurea to produce a diacrylate-terminated oligomer useful in the invention.

Since there are so many ways of producing the required structures, method aspects of this invention are of secondary significance.

From 20%–50% of the total weight of the composition is constituted by a radiation-curable monoethylenically unsaturated monomer having a $T_g$ below about 10° C., preferably below 0° C. Preferred proportions are from 25% to 45% on the same weight basis. As indicated previously, ultraviolet cure is preferred and acrylic monomers are best for this purpose, but other radiations enable all sorts of unsaturations to be used as noted earlier. The purpose here is simply to soften the cured composition and $T_g$ is a recognized criteria for this purpose. $T_g$ designates the glass transition temperature of homopolymers produced from the monomer, and these are well known. Phenoxy alkyl acrylates having 2-4 carbon atoms in the alkyl group, such as phenoxy ethyl acrylate, are preferred, but 2-ethylhexyl acrylate is also useful. Butyl acrylate, dodecyl acrylate, and the acrylic acid ester of 2-butoxy ethanol or 2-ethoxy ethanol are also useful. The corresponding methacrylates, crotonates, maleates, etc. are also useful, usually when radiation other than ultraviolet is intended.

The last component requiring consideration is the monoethylenically unsaturated monomer which has a strong capacity for hydrogen bonding. This monomer is used in an amount of from about 2% to about 20%, preferably from 3% to 10%, based on the total weight of the composition. This hydrogen bonding monomer provides a type of cross-linking which is weak so as to confer limited strength (toughness) without unduly decreasing the capacity for elongation. Ordinary cross-linking agents provide strength, but the elongation is sharply reduced, so the coatings become excessively stiff at low temperature which sharply bends the fiber as the coating thermally contracts. This causes power loss at low temperature which is avoided by this invention.

The desired hydrogen bonding may be obtained using monomers which act as acceptors or donors, acceptors being preferred. Vinyl pyrrolidone is preferred, but other useful monomers are illustrated by diacetone acrylamide, isobutoxymethyl acrylamide, acrylamide, N,N-dimethyl acrylamide, acrylic acid, itaconic acid, and dimethyl aminoethyl acrylate or acrylamide.

The class of hydrogen bonding monomers is a known class. Thus, many monomers, like ethylene, propylene, acrylonitrile, styrene, vinyl chloride, vinylidene chloride, vinyl acetate and other vinyl esters, vinyl ethers and acrylic esters like ethyl acrylate are known to be either incapable of hydrogen bonding or are poor at hydrogen bonding so as to be unusable herein.

BEST MODE FOR CARRYING OUT THE INVENTION

Example 1

Charge to an appropriately stirred reaction vessel 4 moles (1064 grams) of 4,4'-methylene bis (cyclohexyl isocyanate), 2 grams of dibutyltin dilaurate (0.1% based on polyol) and 1 gram of 2,6-ditertiary butyl 4-methyl phenol inhibitor (Ionol). Add to this charge over a period of 4 hours, 2 moles (2000 grams) of polyoxypropylene glycol of molecular weight 1000. Allow the exotherm of the reaction to raise the temperature to about 65° C. and maintain this temperature. After polyol addition is complete hold for ½ hour and then add 2-hydroxyethyl acrylate in an amount of 2 moles (232 grams) over a period of ½ hour. This produces a polyurethane oligomer which is 50% terminated with acrylate groups and 50% terminated with isocyanate groups.

Premix polyoxypropylene diamine (Jeffamine D230) in an amount of 1 mole (230 grams) with 402.5 grams of N-vinyl pyrro. Add the resulting mixture to 1857.5 grams of phenoxyethyl acrylate and then add the mixture promptly to the previously produced acrylate isocyanate in the reactor which is at a temperature of about 65° C. Addition should be as rapid as avoids an increase in temperature above 80° C. and cooling can be used to speed the addition. The isocyanate reaction is preferential, and the acrylate functionality does not react with the hydrogen atoms in the urethane groups which are formed.

When the addition is complete, the reaction is finished, and auxiliary agents can be added at this time or later when the mixture has cooled.

3% diethoxy acetophenone is added (based on the weight of the composition, and serves as a photoinitiator. No separate photosensitizer is needed. The product is then filtered through a 5 micron filter to remove particles and is then stored, ready for use.

In use, the liquid coating composition is coated upon glass fiber and then irradiated with ultraviolet light to cure the coating. An overcoating is usually also applied, but this forms no part of the present invention since any rapidly curing coating, and especially an ultraviolet-curable coating can be applied to cover the basecoat and thereby eliminate any surface tackiness and improve mechanical handling.

What is claimed is:

1. A radiation-curable liquid coating composition which cures on radiation exposure to form a soft and tough coating comprising, a polyurethane, polyamide or polyurea oligomer having (1) a molecular weight in the range of about 2000 to about 8000; (2) amide, urea or urethane groups in an amount of one such group for every 300 to 900 units of weight, and (3) polyalkylene polyether, polyalkylene polysulfide or polyalkylene polyester groups in which the alkylene moiety contains from 2-6 carbon atoms, said polyether, polysulfide or polyester constituting from about 40% to about 90% by weight of said oligomer, each end of said oligomer being terminated with a monoethylenically unsaturated addition polymerizable group, from 20% to 50%, based on the total weight of the composition, of a radiation-curable monoethylenically unsaturated monomer having a $T_g$ below about 10° C., and from about 2% to about 20%, based on the total weight of the composition, of a monoethylenically unsaturated monomer having a strong capacity for hydrogen bonding.

2. A coating composition as recited in claim 1 in which said oligomer is a polyurethane having a molecular weight in the range of about 2500 to about 6000.

3. A coating composition as recited in claim 1 in which said alkylene moiety contains from 2-4 carbon atoms.

4. A coating composition as recited in claim 3 in which said polyether, polysulfide or polyester has a molecular weight of from 300 to 2000.

5. A coating composition as recited in claim 2 in which said polyurethane contains from 50% to 75% of said polyether, said polyether having a molecular weight of from 300 to 2000.

6. A coating composition as recited in claim 1 in which said oligomer is a linear polymer terminated at each end with an acrylate group.

7. A coating composition as recited in claim 6 in which said coating composition is curable with ultraviolet light and contains initiators and/or photosensitizers appropriate for rendering the composition curable by such radiation.

8. A coating composition as recited in claim 6 in which said oligomer is a diisocyanate-terminated linear polyurethane which is reacted with an hydroxyalkyl acrylate containing from 2–4 carbon atoms in the alkyl group.

9. A coating composition as recited in claim 8 in which said acrylate is 2-hydroxyethyl acrylate.

10. A coating composition as recited in claim 6 in which said oligomer is a diisocyanate-terminated linear polyurethane reacted with a half equivalent of 2-hydroxyethyl acrylate to provide a monoethylenic monoisocyanate which is tied together by reaction with a difunctional chain-extending agent.

11. A coating composition as recited in claim 10 in which said chain-extending agent is selected from diamines, diols, amino alcohols, dithiols, diacids and hydroxy acids.

12. A coating composition as recited in claim 1 in which said monomer of low $T_g$ has a $T_g$ below 0° C.

13. A coating composition as recited in claim 1 in which said monomer of low $T_g$ is a phenoxy alkyl acrylate in which the alkyl group has from 2–4 carbon atoms.

14. A coating composition as recited in claim 1 in which polyoxypropylene glycol having a molecular weight of from 600 to 1200 is incorporated into said oligomer.

15. A coating composition as recited in claim 1 in which said hydrogen bonding monomer is vinyl pyrrolidone.

16. A radiation-curable liquid coating composition which cures on radiation exposure to form a soft and tough coating comprising, a polyurethane oligomer diacrylate, said oligomer having (1) a molecular weight in the range of 2500 to 6000; (2) urethane groups in an amount of one such group for every 400 to 600 units of weight; and (3) polyoxypropylene groups having a molecular weight of from 300 to 2000, said polyoxypropylene component constituting from 50% to 75% by weight of said oligomer, from 20% to 50%, based on the total weight of the composition, of a radiation-curable monoethylenically unsaturated monomer having a $T_g$ below about 0° C., and from 3% to 10%, based on the total weight of the composition, of a monoethylenically unsaturated monomer having a strong capacity for hydrogen bonding.

17. A radiation-curable liquid coating composition as recited in claim 16 in which initiators and/or photosensitizers are present to render the composition curable by exposure to ultraviolet light.

18. A radiation-curable liquid coating composition as recited in claim 16 in which said hydrogen bonding monomer is vinyl pyrrolidone.

* * * * *